United States Patent
Titus

(10) Patent No.: US 10,399,419 B2
(45) Date of Patent: Sep. 3, 2019

(54) CONVERTABLE TONNEAU COVER

(71) Applicant: Dusty Titus, Eureka, CA (US)

(72) Inventor: Dusty Titus, Eureka, CA (US)

( * ) Notice: Subject to any disclaimer, the term of this patent is extended or adjusted under 35 U.S.C. 154(b) by 0 days.

(21) Appl. No.: 15/429,161

(22) Filed: Feb. 10, 2017

(65) Prior Publication Data

US 2019/0070940 A1     Mar. 7, 2019

(51) Int. Cl.
*B60J 7/14* (2006.01)
*B60J 7/10* (2006.01)
*B60J 7/19* (2006.01)

(52) U.S. Cl.
CPC .............. *B60J 7/141* (2013.01); *B60J 7/106* (2013.01); *B60J 7/198* (2013.01)

(58) Field of Classification Search
CPC ............. B60J 7/141; B60J 7/107; B60J 7/198
USPC ....................................... 296/26.06
See application file for complete search history.

(56) References Cited

U.S. PATENT DOCUMENTS

| | | | | |
|---|---|---|---|---|
| 3,286,414 A | * | 11/1966 | Harrison | B62D 33/08 296/100.05 |
| 6,435,594 B1 | * | 8/2002 | Ekonen | B60J 7/041 296/100.09 |
| 7,207,614 B2 | * | 4/2007 | Briggs | B60J 7/1614 296/26.06 |

* cited by examiner

*Primary Examiner* — Joseph D. Pape
(74) *Attorney, Agent, or Firm* — The Iwashko Law Firm, PLLC; Lev Ivan Gabriel Iwashko

(57) ABSTRACT

A convertible Tonneau cover that converts into a camper shell of a camper and may convert back to a flat Tonneau cover. The convertible Tonneau cover includes a top portion of a rear hinged door frame that is curved over to protect the top portion of each of the pair of hinged sides. The convertible Tonneau cover also includes an E-hinge clamp with an E-shaped frame and a knurled screw, the E-shaped frame includes a knurled aperture, wherein the knurled screw has a semi-circular portion disposed on an end of the knurled screw to provide more surface area contact with the truck bed while adapted to be tightened within the E-shaped frame. The pair of hinged sides are adapted to fold inward while a bottom portion of the rear hinged door frame is coupled to a bed rail of a truck bed with the E-hinge clamp.

17 Claims, 6 Drawing Sheets

CONVERTABLE TONNEAU COVER

BACKGROUND OF THE INVENTION

Field of the Invention

The present invention is a Tonneau cover. More specifically, the present invention is a convertible Tonneau cover that converts into a camper shell of a camper and back into a Tonneau cover if needed.

Description of the Related Art

Many people that have a camper that live in town or the outskirts know that gas is very expensive. If they could add something to their vehicle to get more mileage per gallon they surely would. Wind-resistance is often a contributor to decreased energy consumption and efficiency. Many times, it is desired that these campers and camper shells convert into a Tonneau cover, which also is a way to cut down wind-resistance and therefore add more mileage per gallon. This also gives the benefit of having a Tonneau cover when wanting a camper cover and having more room.

What is needed is a convertible Tonneau cover that reduces wind-resistance, increases energy efficiency and reduces energy costs and also gives the benefit of having a Tonneau cover when wanting a camper cover and more room.

SUMMARY OF THE INVENTION

The present invention is a Tonneau cover. More specifically, the present invention is a convertible Tonneau cover that converts into a camper shell of a camper and back into a Tonneau cover if needed.

The convertible Tonneau cover includes a Tonneau top surface providing a protective exterior for the convertible Tonneau cover, a pair of hinged sides having a center fold point that is centered across an entire length of each of the pair of hinged sides, the pair of hinged sides include a plurality of hinges, a plurality of rubber strips and an E-hinge clamp, the hinges include a first hinge, a second hinge and a third hinge, each of the pair of hinged sides include a top portion and a bottom portion, a pair of hinged doors attached with one or more hinges at a front end and a back end of the convertible Tonneau cover, the pair of hinged doors are adapted to swing outward and upward and inward and upward, the pair of hinged doors include a front hinged door and a rear hinged door, the rear hinged door positioned underneath the Tonneau top surface, the rear hinged door including a rear hinged door frame, a rear door, a weather skirt and a lockable twist handle, the rear door is contained within the rear hinged door frame, the lockable twist handle is centered near a bottom portion of each of the pair of hinged doors and a pair of clamps coupling each of the pair of hinged sides to each bed rail of a truck bed.

It is an object of the present invention to provide a convertible Tonneau cover that converts into a camper shell of a camper when wanting a camper cover and more room.

It is an object of the present invention to provide a convertible Tonneau cover that converts into a camper shell of a camper and may convert back to a flat Tonneau cover.

It is an object of the present invention to provide a convertible Tonneau cover that reduces wind-resistance, increases energy efficiency and reduces energy costs.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials, and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention however the order of description should not be construed as to imply that these operations are necessarily order dependent. These operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
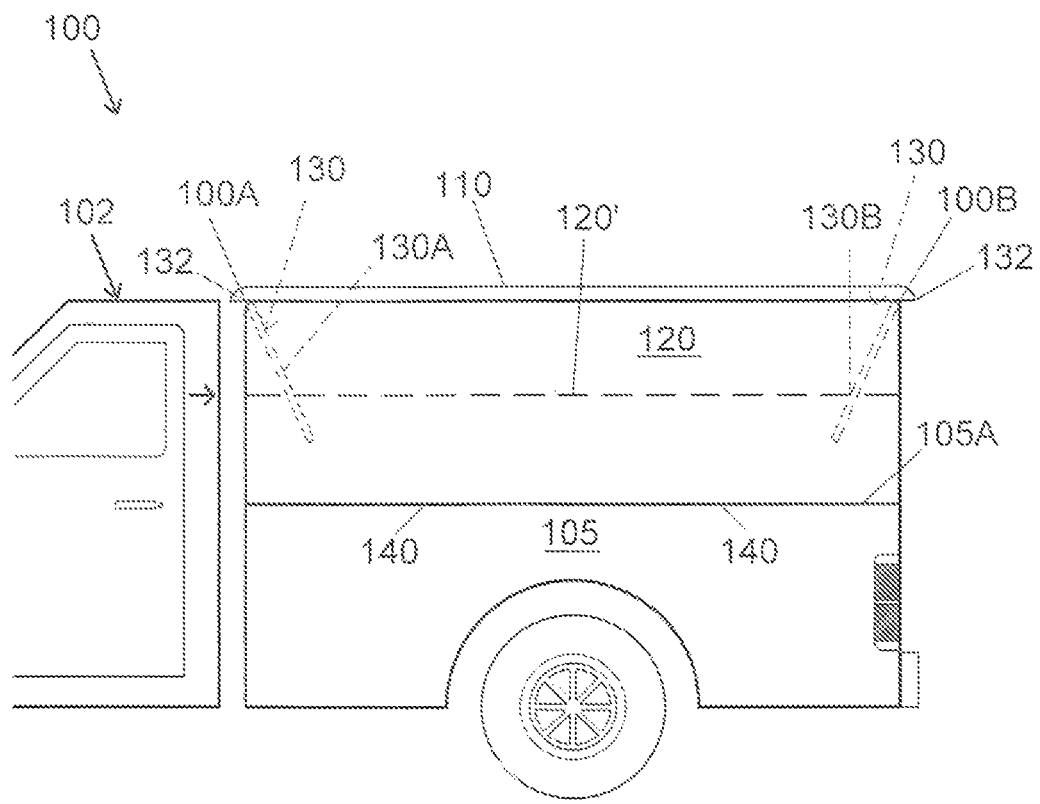
FIG. 1 illustrates an environmental side view of a convertible Tonneau cover, in accordance with one embodiment of the present invention.

FIG. 1 illustrates an environmental side view of a convertible Tonneau cover 100, in accordance with one embodiment of the present invention.

The convertible Tonneau cover 100 may include a Tonneau top surface 110, a pair of hinged sides 120, a pair of hinged doors 130 and a pair of E-hinge clamps 126. FIG. 1 illustrates the convertible Tonneau cover 100 attached over a truck bed 105 as a camper shell of a camper 102.

Figure 6:
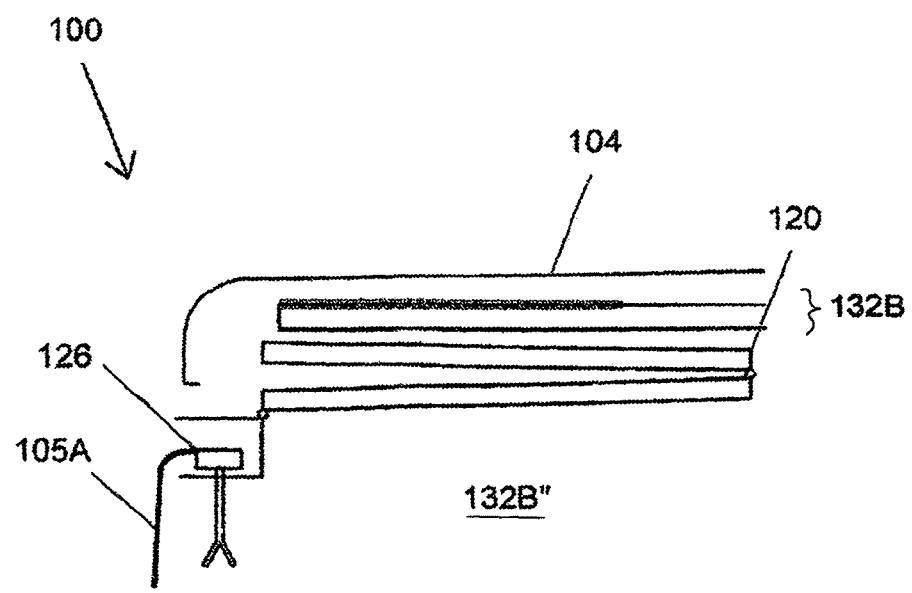
FIG. 6 illustrates an E-hinge clamp and one of a pair of hinged sides, in accordance with one embodiment of the present invention.

The Tonneau top surface 110 may provide a protective exterior for the convertible Tonneau cover 100. The pair of hinged sides 120 may each include a center fold point 120' that may be centered across an entire length of each of the pair of hinged sides 120. The pair of hinged sides 120 may be adapted to fold upwards at the center fold point 120' to convert the convertible Tonneau cover 100 into a flat Tonneau cover (FIG. 6, 104). The pair of hinged doors 130 may be attached with one or more hinges 132 at a front end 100A and a back end 100B of the convertible Tonneau cover 100. The pair of hinged doors 130 may be adapted to swing outward and upward and inward and downward. The pair of hinged doors 130 may include a front hinged door 130A and a rear hinged door 130B. The pair of E-hinge clamps 126 may couple each of the pair of hinged sides 120 to each bed rail 105A of the truck bed 105.

Figure 2:
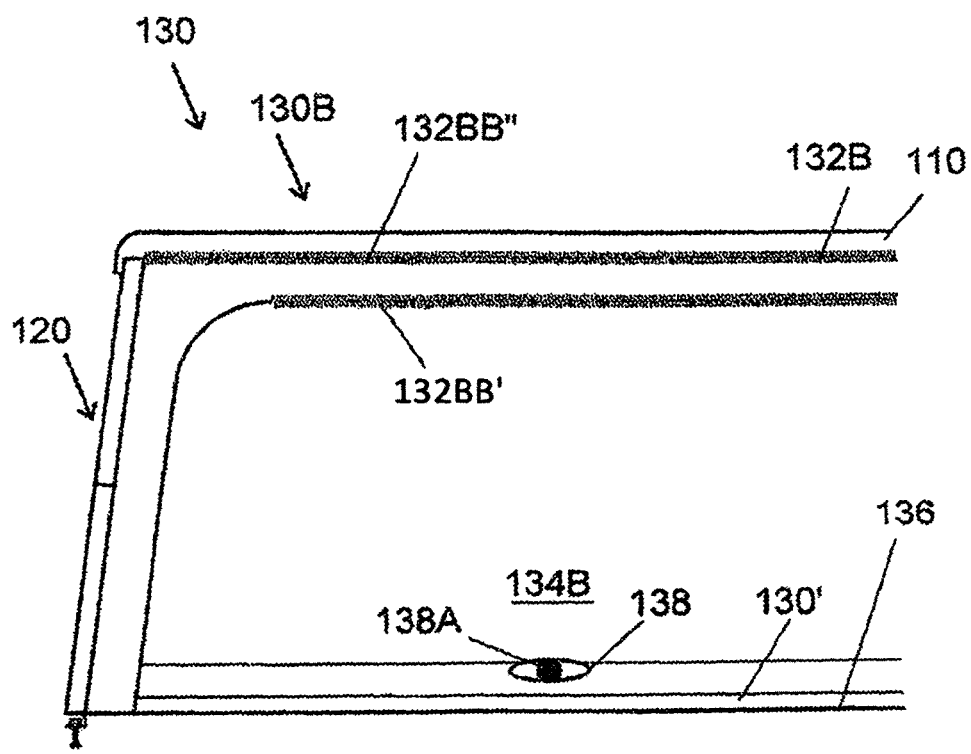
FIG. 2 illustrates a front view of one of the pair of hinged doors, in accordance with one embodiment of the present invention.

FIG. 2 illustrates a front view of one of the pair of hinged doors 130, in accordance with one embodiment of the present invention. FIG. 2 illustrates the rear hinged door 130B of the pair of hinged doors 130.

The rear hinged door 130B may include a rear hinged door frame 132B, a rear door 134B, a weather skirt 136 and a lockable twist handle 138.

The rear hinged door frame 132B may be positioned underneath the Tonneau top surface 110. The rear hinged door frame 132B may include a protective inside fray 132BB' and a protective outside fray 132BB" to protect the rear hinged door frame 132B from damage. The rear door 134B may be contained within the rear hinged door frame 132B and may be selected from the group consisting of a transparent door, an opaque door or a solid door. The weather skirt 136 may be disposed on the bottom portion 130' of the rear hinged door 130B to prevent weather elements such as rain, wind or snow and debris from seeping underneath the rear door 134B. The lockable twist handle 138 may include a key lock 138A disposed on the lockable twist handle 138 adapted to lock the lockable twist handle 138 shut. The lockable twist handle 138 may be centered near the bottom portion 130' of each of the pair of hinged doors 130.

Figure 3:
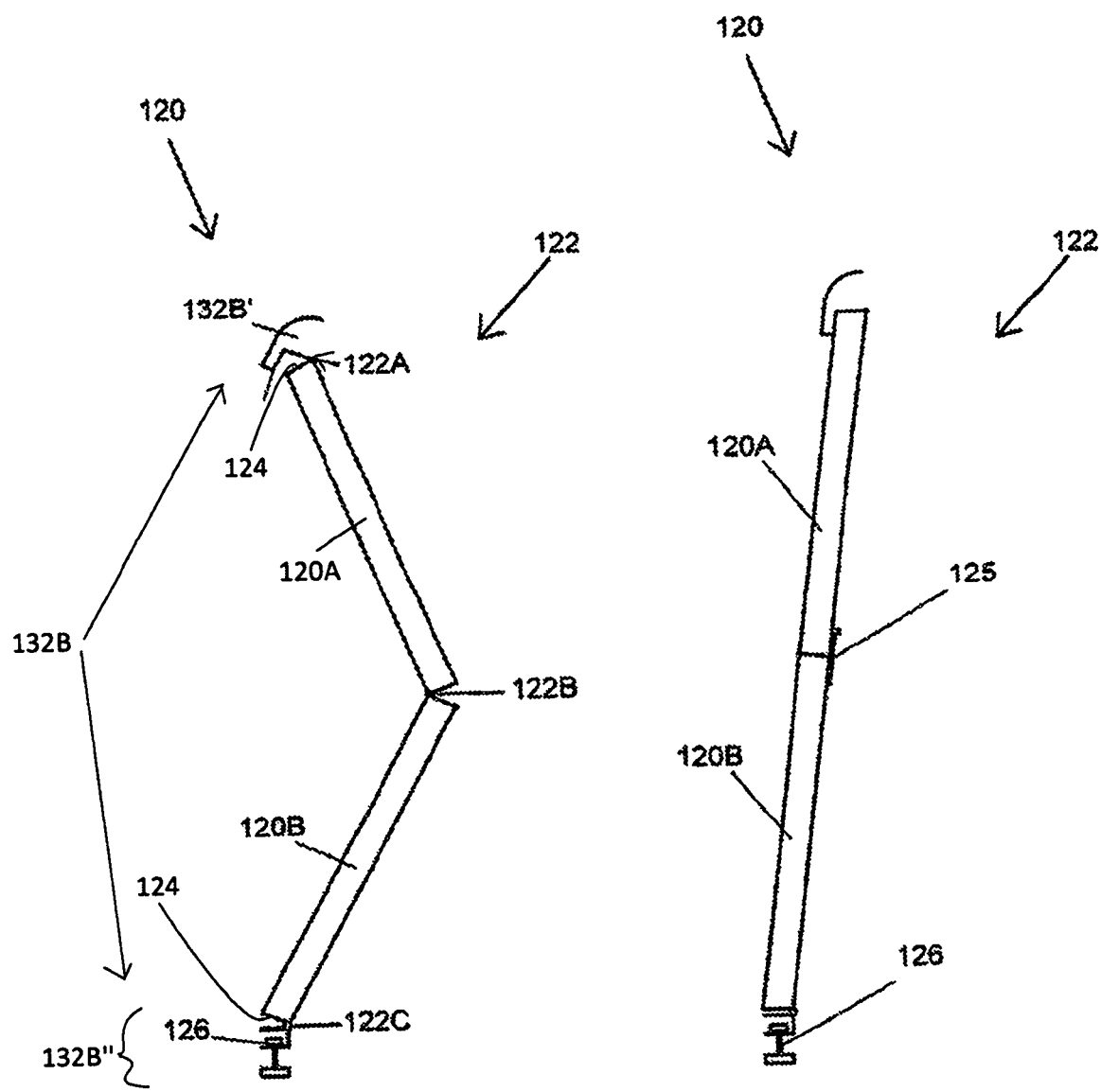
FIG. 3 illustrates a side view of a pair of hinged sides, in accordance with one embodiment of the present invention.

FIG. 3 illustrates a side view of a pair of hinged sides 120, in accordance with one embodiment of the present invention. FIG. 3 illustrates one of the pair of hinged sides 120 in a locked position and one of the pair of hinged sides 120 in an unlocked position.

Each of the pair of hinged sides 120 may include a plurality of hinges 122, a plurality of rubber strips 124 and an E-hinge clamp 126. The hinges 122 may include a first hinge 122A, a second hinge 122B and a third hinge 122C.

Each of the pair of hinged sides 120 may include a top portion 120A and a bottom portion 120B. The top portion 132B' of the rear hinged door frame 132B may be curved over to protect the top portion 120A of each of the one of the pair of hinged sides 120. The top portion 132B' of the rear hinged door frame 132B may be hingedly attached to the top portion 120A of each of the one of the pair of hinged sides 120 with the first hinge 122A. The top portion 120A of each of the one of the pair of hinged sides 120 may be hingedly attached to the bottom portion 120B of each of the one of the pair of hinged sides 120 with the second hinge 122B. The bottom portion 120B of each of the one of the pair of hinged sides 120 may be hingedly attached to a bottom portion 132B" of the rear hinged door frame 132B with the third hinge 122C. The rubber strips 124 may be placed between the top portion 120A of the one of the pair of hinged sides 120 and the top portion 132B' of the rear hinged door frame 132B, between the top portion 120A and the bottom portion 120B of each of the pair of hinged sides 120 and the bottom portion 132B" of the rear hinged door frame 132B and the bottom portion 120B of the one of the pair of hinged sides 120 to prevent damage to the pair of hinged sides 120.

Each of the pair of hinged sides 120 may lock a top portion 120A of one of the pair of hinged sides 120 with a slide lock 125 or other suitable lock to a bottom portion 120B of one of the pair of hinged sides 120, thereby putting the one of the pair of hinged sides 120 in a locked position.

Figure 4:
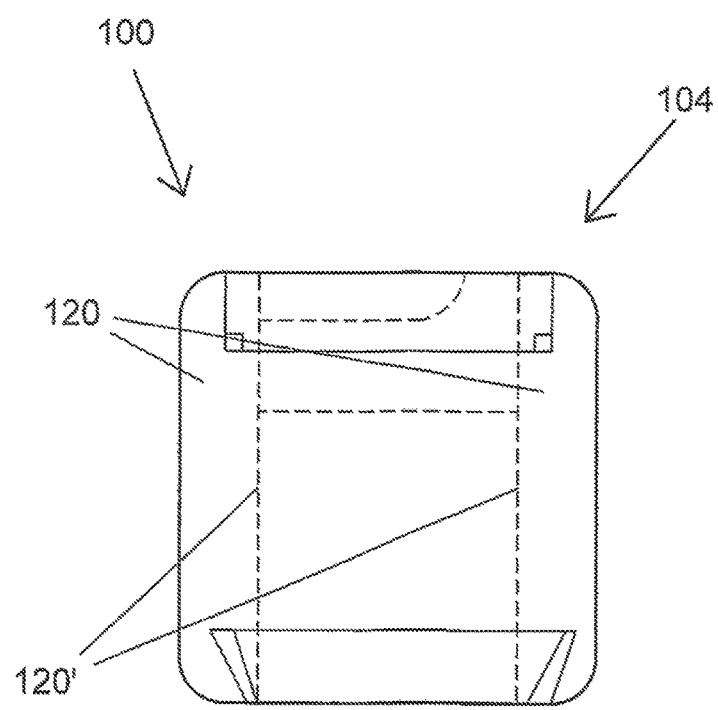
FIG. 4 illustrates an overhead view of a convertible Tonneau cover, in accordance with one embodiment of the present invention.

FIG. 4 illustrates an overhead view of a convertible Tonneau cover 100, in accordance with one embodiment of the present invention.

The pair of hinged sides 120 of the convertible Tonneau cover 100 may be adapted to fold upwards at the center fold point 120' to convert the convertible Tonneau cover 100 into a flat Tonneau cover 104.

Figure 5:
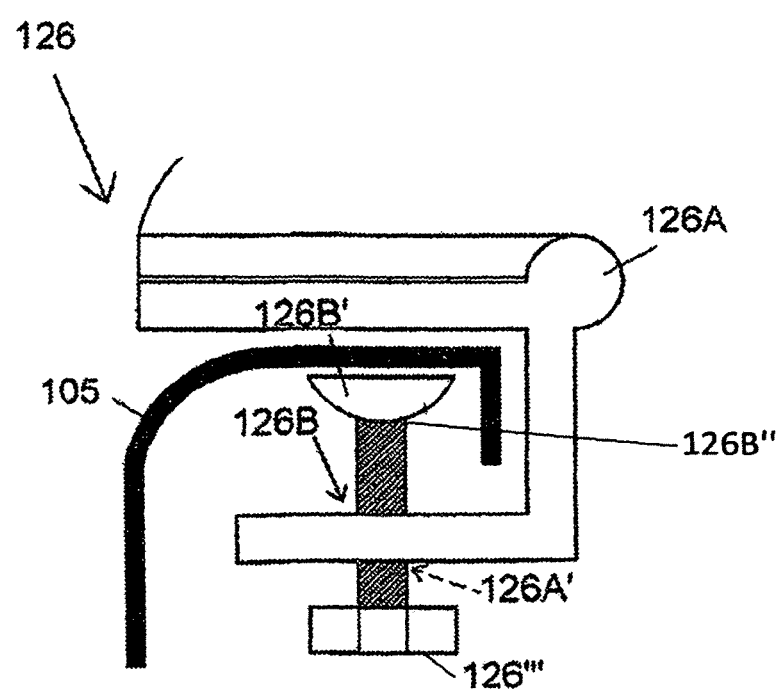
FIG. 5 illustrates an E-hinge clamp, in accordance with one embodiment of the present invention.

FIG. 5 illustrates an E-hinge clamp 126, in accordance with one embodiment of the present invention.

The E-hinge clamp 126 may include a E-shaped frame 126A and a knurled screw 126B. The E-shaped frame 126A may include a knurled aperture 126A'. The knurled screw 126B may have a semi-circular portion 126B' disposed on an end 126B" of the knurled screw 126B to provide more surface area contact with the truck bed 105 while adapted to be tightened within the E-shaped frame 126A. The knurled screw 126B may extend through the knurled aperture 126A' and have a screw head 126'" adapted to tighten the truck bed 105 within the E-shaped frame 126A.

FIG. 6 illustrates an E-hinge clamp 126 and one of a pair of hinged sides 120, in accordance with one embodiment of the present invention. FIG. 6 illustrates a convertible Tonneau cover 100 as a flat Tonneau cover 104.

The pair of hinged sides 120 may be adapted to fold inward while the bottom portion 132B" of the rear hinged door frame 132B may be coupled to the bed rail (FIG. 1, 105A) of the truck bed (FIG. 1, 105) with the E-hinge clamp 126.

While the present invention has been related in terms of the foregoing embodiments those skilled in the art will recognize that the invention is not limited to the embodiments described. The present invention may be practiced with modification and alteration within the spirit and scope of the appended claims. Thus, the description is to be regarded as illustrative instead of restrictive on the present invention.

What is claimed is:

1. A convertible tonneau cover, comprising:
   a tonneau top surface providing a protective exterior for the convertible tonneau cover;
   a pair of hinged sides having a center fold point that is centered across an entire length of each of the pair of hinged sides, the pair of hinged sides include a plurality of hinges, and a plurality of rubber strips, the hinges include a first hinge, a second hinge and a third hinge, each of the pair of hinged sides include a top portion and a bottom portion;
   a pair of hinged doors attached with one or more hinges at a front end and a back end of the convertible tonneau cover, the pair of hinged doors are adapted to swing outward and upward and inward and upward, the pair of hinged doors include a front hinged door and a rear hinged door, the rear hinged door positioned underneath the tonneau top surface, the rear hinged door including a rear hinged door frame, a rear door, a weather skirt and a lockable twist handle, the rear door is contained within the rear hinged door frame, the lockable twist handle is centered near a bottom portion of each of the pair of hinged doors; and
   a pair of E-hinge clamps coupling each of the pair of hinged sides to each bed rail of a truck bed.

2. The convertible tonneau cover according to claim 1, wherein the pair of hinged sides are adapted to fold downwards at the center fold point to convert the convertible tonneau cover into a flat tonneau cover.

3. The convertible tonneau cover according to claim 1, wherein the portion of the rear hinged door frame is curved over to protect the top portion of each of the pair of hinged sides.

4. The convertible tonneau cover according to claim 1, wherein the top portion of the rear hinged door frame is hingedly attached to the top portion of each of the pair of hinged sides with the first hinge.

5. The convertible tonneau cover according to claim 1, wherein the top portion of each of the one of the pair of hinged sides are hingedly attached to the bottom portion of each of the pair of hinged sides with the second hinge.

6. The convertible tonneau cover according to claim 1, wherein the bottom portion of each of the pair of hinged sides are hingedly attached to a bottom portion of the rear hinged door frame with the third hinge.

7. The convertible tonneau cover according to claim 1, wherein the rubber strips are placed between the top portion of one of the pair of hinged sides and the top portion of the rear hinged door frame, between the top portion and the bottom portion of each of the pair of hinged sides and between the bottom portion of the rear hinged door frame and the bottom portion of one of the pair of hinged sides to prevent damage to the pair of hinged sides.

8. The convertible tonneau cover according to claim 1, wherein each of the pair of hinged sides lock the top portion of one of the pair of hinged sides with a slide lock to the bottom portion of one of the pair of hinged sides, thereby putting each of the pair of hinged sides in a locked position.

9. The convertible tonneau cover according to claim 1, wherein the E-hinge clamp includes an E-shaped frame and a knurled screw.

10. The convertible tonneau cover according to claim 9, wherein the E-shaped frame includes a knurled aperture.

11. The convertible tonneau cover according to claim 9, wherein the knurled screw has a semi-circular portion disposed on an end of the knurled screw to provide more surface area contact with the truck bed adapted to be tightened within the E-shaped frame.

12. The convertible tonneau cover according to claim 9, wherein the knurled screw extends through the knurled aperture and has a screw head adapted to tighten the truck bed within the E-shaped frame.

13. The convertible tonneau cover according to claim 1, wherein the pair of hinged sides are adapted to fold inward while the bottom portion of the rear hinged door frame is coupled to the bed rail of the truck bed with the E-hinge clamp.

14. The convertible tonneau cover according to claim 1, wherein the rear hinged door frame includes a protective inside fray and a protective outside fray to protect the rear hinged door frame from damage.

15. The convertible tonneau cover according to claim 1, wherein the rear door is selected from the group consisting of a transparent door, an opaque door or a solid door.

16. The convertible tonneau cover according to claim 1, wherein the weather skirt is disposed on the bottom portion of the rear hinged door to prevent weather elements and debris from seeping underneath the rear door.

17. The convertible tonneau cover according to claim 1, wherein the lockable twist handle includes a key lock disposed on the lockable twist handle adapted to lock the lockable twist handle shut.

\* \* \* \* \*